United States Patent
Murakami

(10) Patent No.: US 11,254,300 B2
(45) Date of Patent: Feb. 22, 2022

(54) DRIVE SYSTEM

(71) Applicant: SUBARU CORPORATION, Tokyo (JP)

(72) Inventor: Yukihiko Murakami, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 200 days.

(21) Appl. No.: 16/518,312

(22) Filed: Jul. 22, 2019

(65) Prior Publication Data

US 2020/0101963 A1 Apr. 2, 2020

(30) Foreign Application Priority Data

Sep. 28, 2018 (JP) .............................. JP2018-184679

(51) Int. Cl.
*B60W 20/10* (2016.01)
*F16H 57/04* (2010.01)
(Continued)

(52) U.S. Cl.
CPC ............ *B60W 20/10* (2013.01); *B60W 10/06* (2013.01); *B60W 10/08* (2013.01);
(Continued)

(58) Field of Classification Search
CPC ...... B60W 20/10; B60W 10/04; B60W 10/02; B60W 20/17; B60W 10/06; B60W 10/08;
(Continued)

(56) References Cited

U.S. PATENT DOCUMENTS

| 5,967,940 | A | 10/1999 | Yamaguchi |
| 7,974,742 | B2 * | 7/2011 | Enis ........................ F03D 9/257 700/291 |

(Continued)

FOREIGN PATENT DOCUMENTS

| JP | H11-093725 A | 4/1999 |
| JP | 2010-138751 A | 6/2010 |

(Continued)

OTHER PUBLICATIONS

Notification of Reasons of Refusal issued in corresponding Japanese Patent Application No. 2018-184679, dated Dec. 17, 2019, with English translation.

*Primary Examiner* — Marthe Y Marc-Coleman
(74) *Attorney, Agent, or Firm* — McDermott Will & Emery LLP

(57) ABSTRACT

A driving system includes an engine an engine, a motor generator, a gear mechanism, and a controller. The gear mechanism couples the engine and the motor generator to each other. The gear mechanism includes first and second gears. The first and second gears are configured to be supplied with first driving torque from the engine and second driving torque from the motor generator, respectively. The second gear meshes with the first gear. The controller is configured to perform torque control of the engine to make a rate of variation in the first driving torque at the first gear at a time when the following conditional expression (1) is satisfied smaller than that at a time when the following conditional expression (1) is not satisfied.

$$|T2-T1| < Th1 \qquad (1)$$

T1 is the first driving torque, T2 is the second driving torque, and Th1 is a first threshold.

12 Claims, 2 Drawing Sheets

(51) Int. Cl.
*B60W 10/06* (2006.01)
*B60W 10/08* (2006.01)
*B60K 6/365* (2007.10)

(52) U.S. Cl.
CPC .......... *F16H 57/0413* (2013.01); *B60K 6/365* (2013.01); *B60W 2510/0657* (2013.01); *B60W 2510/083* (2013.01); *B60W 2530/00* (2013.01); *B60W 2710/0672* (2013.01); *B60W 2710/085* (2013.01); *B60Y 2300/18183* (2013.01)

(58) Field of Classification Search
CPC ........... B60W 30/20; B60W 2510/084; B60W 20/00; B60W 2510/083; B60W 2510/1065; B60W 2610/08; Y02T 10/62; Y02T 10/64; B60K 6/445; B60L 2240/423
See application file for complete search history.

(56) References Cited

U.S. PATENT DOCUMENTS

| | | | |
|---|---|---|---|
| 2008/0004780 A1* | 1/2008 | Watanabe | B60K 6/40 701/54 |
| 2011/0185847 A1* | 8/2011 | Tanba | B60W 30/20 74/661 |
| 2013/0054064 A1 | 2/2013 | Tamura et al. | |
| 2016/0304081 A1 | 10/2016 | Tsuchida | |

FOREIGN PATENT DOCUMENTS

| | | |
|---|---|---|
| JP | 2011-230725 A | 11/2011 |
| JP | 2015-024688 A | 2/2015 |
| JP | 2016-203664 A | 12/2016 |
| WO | 2011/108066 A1 | 9/2011 |

* cited by examiner

DRIVE SYSTEM

CROSS-REFERENCE TO RELATED APPLICATIONS

The present application claims priority from Japanese Patent Application No. 2018-184679 filed on Sep. 28, 2018, the entire contents of which are hereby incorporated by reference.

BACKGROUND

The technology relates to a driving system to be mounted on a driving apparatus of a vehicle or any other movable body.

A vehicle driving system has been developed that has an engine and two motors, and is configured to combine any of driving torque of the engine and driving torque of the two motors. One example of the foregoing vehicle driving system is disclosed in Japanese Unexamined Patent Application Publication No. 2016-203664.

SUMMARY

An aspect of the technology provides a driving system that includes an engine, a motor generator, a gear mechanism, and a controller. The gear mechanism couples the engine and the motor generator to each other. The gear mechanism includes a first gear and a second gear. The first gear is configured to be supplied with first driving torque from the engine. The second gear is configured to be supplied with second driving torque from the motor generator and meshes with the first gear. The controller is configured to perform torque control of the engine to make a rate of variation in the first driving torque at the first gear at a time when the following conditional expression (1) is satisfied smaller than a rate of variation in the first driving torque at the first gear at a time when the following conditional expression (1) is not satisfied, $$|T2-T1|<Th1 \qquad (1)$$

where T1 is the first driving torque, T2 is the second driving torque, and Th1 is a first threshold.

BRIEF DESCRIPTION OF THE DRAWINGS

The accompanying drawings are included to provide a further understanding of the disclosure, and are incorporated in and constitute a part of this specification. The drawings illustrate implementations and, together with the specification, serve to explain the principles of the disclosure.

DETAILED DESCRIPTION

Figure 1:
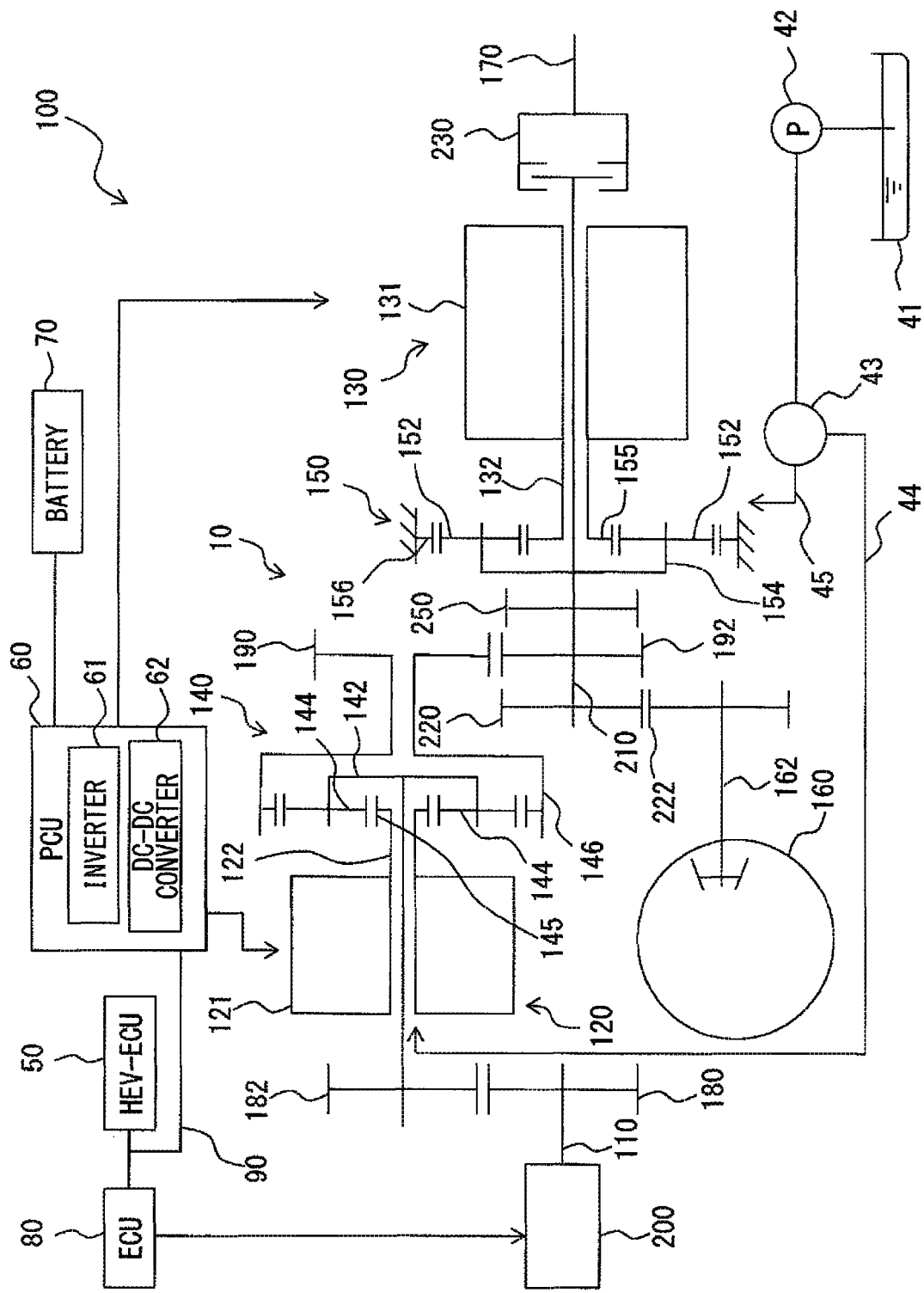
FIG. 1 is a schematic diagram illustrating an example of an outline configuration of a vehicle driving system according to one example implementation of the technology.

In the following, a detailed description is given of one example implementation of the technology with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example implementations which are not recited in a most-generic independent claim of the disclosure are optional and may be provided on an as-needed basis. Throughout the present specification and the drawings, elements having substantially the same function and configuration are denoted with the same numerals to avoid any redundant description. The description is given in the following order.

1. Example Implementation (An example of a vehicle driving system having an engine and two motor generators)
2. Modification Examples In a driving system, a gear rattle may occur at a gear mechanism that receives engine torque and motor torque and combine the received engine torque and the received motor torque, in some cases. The gear rattle may occur due to, for example, variation in a magnitude relationship between driving torque of the engine and driving torque of the motor.

It is desirable to provide a driving system that makes it more difficult for such a gear rattle to occur.

1. Example Implementation

[Outline Configuration of Vehicle Driving System 100]

FIG. 1 schematically illustrates an example of an outline configuration of a power transmission system in a vehicle driving system 100 according to one example implementation of the technology. The vehicle driving system 100 may be mounted on a hybrid electric vehicle that has an engine 200 and a motor generator (MG) 121, and the vehicle driving system 100 may drive this vehicle. The hybrid electric vehicle may be simply referred to as a "vehicle", hereinafter. As illustrated in FIG. 1, the vehicle driving system 100 may include an output shaft 110, rotational driving devices 120 and 130, planetary gear mechanisms 140 and 150, a front differential 160, and a propeller shaft 170. The output shaft 110 may be rotated by driving force of the engine 200. The rotational driving device 120 may include the motor generator 121 directed to generating of electric power. The rotational driving device 130 may include a motor generator (MG) 131 directed to driving of the vehicle. The front differential 160 may transmit driving force to front wheels which are not illustrated in the drawing. The propeller shaft 170 may transmit driving force to rear wheels via a rear differential which is not illustrated in the drawing.

In one implementation, the engine 200 may serve as an "engine." In one implementation, the output shaft 110 may serve as an "output shaft." In one implementation, each of the motor generator 121 and the motor generator 131 may serve as a "motor generator."

The vehicle driving system 100 may include a gear mechanism 10 that couples the engine 200 and each of the motor generator 121 and the motor generator 131 to each other. The gear mechanism 10 may include, in addition to the planetary gear mechanisms 140 and 150, transmission gears 190 and 192 and a driving shaft 210. The transmission gears 190 and 192 may each be provided between the planetary gear mechanism 140 and the motor generator 131. The gear mechanism 10 may be cooled and lubricated by oil, such as an automatic transmission fluid (ATF). The oil may be circulated by an oil pump 42 which will be described later.

The vehicle driving system 100 may further include deceleration gears 180 and 182, a coupling 230, a parking gear 250, transmission gears 220 and 222, and a wheel driving shaft 162. The deceleration gears 180 and 182 may each be provided between the output shaft 110 and the motor generator 121. The coupling 230 may be interposed between the planetary gear mechanism 150 and the propeller shaft 170. The parking gear 250, the transmission gears 220 and 222, and the wheel driving shaft 162 may each be provided between the motor generator 131 and the front differential 160.

[Rotational Driving Device 120]

The rotational driving device 120 may include the motor generator 121 and a driving shaft 122. The driving shaft 122 may be rotationally driven by the driving force of the engine 200 that is transmitted from the output shaft 110. The motor generator 121 may be, for example, a three-phase alternating-current synchronous motor and may operate mainly as a generator. The motor generator 121 may generate electric power by using the driving force of the engine 200 that is transmitted from the output shaft 110 via the driving shaft 122. The generated electric power may be charged in a battery 70 which will be described later. The generated electric power may also be used as a driving source of the motor generator 131 directed to driving of the vehicle. The motor generator 121 is not limited to an alternating-current synchronous motor. In one example implementation, the motor generator 121 may be an alternating-current induction motor or a direct-current motor.

[Planetary Gear Mechanism 140]

The planetary gear mechanism 140 may serve as a power distribution and combining mechanism that combines and distributes the driving force of the engine 200, driving force of the motor generator 121, and driving force of the motor generator 131. The planetary gear mechanism 140 may include a carrier 142, a pinion gear 144, a sun gear 145, and a ring gear 146. The sun gear 145 may be coupled to the driving shaft 122. The driving force of the engine 200 may be transmitted from the output shaft 110 to the carrier 142 via the deceleration gears 180 and 182 and may be further transmitted to the driving shaft 122 via the pinion gear 144 and the sun gear 145. The driving force of the engine 200 that is transmitted to the carrier 142 may also be transmitted to the ring gear 146 via the pinion gear 144. After the driving force of the engine 200 is transmitted to the ring gear 146, the driving force may be further transmitted to the driving shaft 210 via the transmission gears 190 and 192.

[Rotational Driving Device 130]

The rotational driving device 130 may include the motor generator 131 and an output shaft 132. The motor generator 131 may be, for example, a three-phase alternating-current synchronous motor and may operate mainly as a power source that generates driving force directed to driving of the vehicle. The driving force that is generated by the motor generator 131 may be transmitted to the driving shaft 210 via the output shaft 132 and the planetary gear mechanism 150. The motor generator 131 is not limited to an alternating-current synchronous motor. In one example implementation, the motor generator 131 may be an alternating-current induction motor or a direct-current motor.

[Planetary Gear Mechanism 150]

The planetary gear mechanism 150 may serve as a deceleration gear mechanism and may include a pinion gear 152, a carrier 154, a sun gear 155, and a ring gear 156. The carrier 154 may be fixed to the driving shaft 210. The sun gear 155 may be coupled to the output shaft 132. The driving force that is generated by the motor generator 131 may be transmitted to the carrier 154 that is fixed to the driving shaft 210, via the output shaft 132, the sun gear 155, the carrier 154, and the pinion gear 152. The above-described mechanism may cause the driving force of the engine 200 and the driving force of the motor generator 131 directed to driving of the vehicle to be combined at the driving shaft 210.

The driving force of the driving shaft 210 may be transmitted to the wheel driving shaft 162 of the front differential 160 via the transmission gears 220 and 222. The front differential 160 may be rotationally driven by the driving force, of the driving shaft 210, which is transmitted to the wheel driving shaft 162. The driving force of the driving shaft 210 may also be transmitted to the propeller shaft 170 while a difference in number of rotation between the front wheels and the rear wheels is absorbed by the coupling 230. The propeller shaft 170 may be coupled to the rear wheels via a component such as the rear differential. During usual traveling of the vehicle, number of rotation of the driving shaft 210 may be determined by a ratio of number of rotation of the engine 200 and number of rotation of the motor generator 121 directed to generating of electric power. In one example, 30% of output of the engine 200 may be consumed by the motor generator 121 to generate electric power, and the remaining 70% may be consumed to drive the wheel. One example implementation of the technology describes the vehicle driving system 100 of a full time four wheel drive (4WD) vehicle in which the driving force of the driving shaft 210 is transmitted to the front wheels and the rear wheels. It may also be possible, however, to apply the vehicle driving system 100 to a front-engine front-drive (FF) type vehicle driving system in which the driving force of the driving shaft 210 is transmitted to the front wheels and to a front-engine rear-drive (FR) type vehicle driving system in which the driving force of the driving shaft 210 is transmitted to the rear wheels.

As illustrated in FIG. 1, the vehicle driving system 100 may also include an engine control unit 80, a hybrid electric vehicle control unit 50, a controller area network (CAN) 90, a power control unit 60, the battery 70, an oil pan 41, the oil pump 42, and an oil cooler 43. Hereinafter, the engine control unit 80 may be simply referred to as an "ECU 80", the hybrid electric vehicle control unit 50 may be simply referred to as an "HEV-ECU 50", and the power control unit 60 may be simply referred to as a "PCU 60."

The engine 200 may include, for example, a fuel injection device, an ignition device, and a throttle valve, and the operation of the engine 200 may be controlled by the ECU 80. The ECU 80 may be coupled to various types of sensors including a crank angle sensor, an accelerator pedal sensor, and a coolant temperature sensor. The crank angle sensor may measure a rotation position of the output shaft 110 or the number of rotation of the engine 200. The accelerator pedal sensor may measure a stepped-down amount of an accelerator pedal, that is, a position of the accelerator pedal. The coolant temperature sensor may measure a temperature of a coolant of the engine 200.

The ECU 80 may control the engine 200 by controlling various types of devices including the fuel injection device, the ignition device, and the throttle valve, on the basis of various pieces of information obtained from these devices and control information from the HEV-ECU 50. The ECU 80 may transmit various pieces of information including the position of the accelerator pedal, the number of rotation of the engine 200, and the temperature of the coolant, to the HEV-ECU 50 via the CAN 90.

The oil pan 41 may contain oil, such as an ATF, directed to lubricating and cooling of, for example, the motor generators 121 and 131, the deceleration gears 180 and 182, the transmission gears 190, 192, 220, and 222, and the planetary gear mechanisms 140 and 150.

The oil pump 42 may be of a mechanical type and may supply the oil contained in the oil pan 41 to, for example, the motor generators 121 and 131. The oil pump 42 may be driven by the engine 200 to pump up the oil contained in the oil pan 41, raise pressure of the oil, and discharge the oil. The oil that is discharged from the oil pump 42 may be pressure-fed to the oil cooler 43 and thereafter be supplied to, for example, the motor generators 121 and 131 via oil paths 44 and 45, respectively. The oil that is supplied to, for example, the motor generators 121 and 131 may circulate inside the vehicle driving system 100 and thereafter return to the oil pan 41. In the vehicle driving system 100, an amount of the oil discharged from the oil pump 42 may vary in accordance with to the number of rotation of the output shaft 110 of the engine 200. In a specific but non-limiting example, the amount of the oil discharged from the oil pump 42 may increase with increase in the number of rotation of the output shaft 110 of the engine 200, and the amount of the oil discharged from the oil pump 42 may decrease with decrease in the number of rotation of the output shaft 110 of the engine 200. For example, a coaxial inscribed trochoid gear pump or a chain-driven vane pump may be suitably used as the mechanical oil pump 42.

The vehicle driving system 100 may be further provided with an electric oil pump. The electric oil pump may be driven by an electric motor to raise the pressure of the oil contained in the oil pan 41, discharge the oil, and pressure-feed this oil to the oil cooler 43, for example, when the engine 200 is stopped. The electric oil pump may be thus driven under control of the HEV-ECU 50.

The oil cooler 43 may be of an air-cooled type. The oil cooler 43 may be provided downstream of the oil pump 42 and may make the oil discharged from the oil pump 42 exchange heat with a cooling medium, thereby cooling the oil. The cooling medium may be, for example, air. The oil cooler 43 is not limited to the air-cooled oil cooler. In one example implementation, the oil cooler 43 may be, for example, a water-cooled oil cooler that makes the oil exchange heat with cooling water.

The engine 200 and the motor generators 121 and 131 may serve as driving power sources and may be generally controlled by the HEV-ECU 50. In one implementation, the HEV-ECU 50 may serve as a "controller."

The HEV-ECU 50 may include, for example, a microprocessor, a read-only memory (ROM), a random-access memory (RAM), a backup RAM, and an input-output interface (I/F). The microprocessor may perform arithmetic operation. The ROM may hold information such as a program that causes the microprocessor to execute various processes. The RAM may hold various pieces of data such as a result of the arithmetic operation. The backup RAM may hold contents of the stored data.

The HEV-ECU 50 may be coupled to various types of sensors including an outside-temperature sensor and a vehicle speed sensor. The outside-temperature sensor may measure a temperature of outside air. The vehicle speed sensor may measure a speed of the vehicle. The HEV-ECU 50 may be also coupled to units such as the ECU 80 or a vehicle dynamic control unit via the CAN 90 in a mutually communicable manner. The ECU 80 may control the engine 200. The vehicle dynamic control unit may be referred to as a "VDCU", hereinafter. The HEV-ECU 50 may receive various pieces of information such as the number of rotation of the engine 200, the temperature of the coolant, and the position of the accelerator pedal from the ECU 80 and the VDCU via the CAN 90.

The HEV-ECU 50 may generally control driving of the engine 200 and the motor generators 121 and 131 on the basis of the obtained various pieces of information. The HEV-ECU 50 may calculate a requested output of the engine 200 and a torque command value of each of the motor generators 121 and 131 on the basis of factors such as the position of the accelerator pedal, which reflects driving force requested by a driver, a driving state of the vehicle, and a state-of-charge (SOC) of the battery 70. The HEV-ECU 50 may output results of these calculations.

The ECU 80 may adjust, for example, a degree of opening of a throttle valve of the engine 200 on the basis of the above-described requested output of the engine 200 which is output from the HEV-ECU 50. The PCU 60 may drive the motor generators 121 and 131 via an inverter 61 on the basis of the above-described torque command values output from the HEV-ECU 50. The inverter 61 will be described later.

The PCU 60 may include the inverter 61 and a DC-DC converter 62. The inverter may convert direct-current power from the battery 70 into three-phase alternating-current power and may supply this alternating-current power to the motor generator 131. As described above, the PCU 60 may drive the motor generators 121 and 131 via the inverter 61 on the basis of the torque command values received from the HEV-ECU 50. The inverter 61 may convert alternating-current voltage generated by the motor generators 121 and 131 into direct-current voltage and may charge the battery 70. The DC-DC converter 62 may make direct-current high voltage of the battery 70 drop to 12 V in order to use the battery 70 as a power source of auxiliary devices and each of the ECU 80 and the HEV-ECU 50.

[Operation of Vehicle Driving System 100]
[Forward-Traveling Operation of Vehicle]

When the vehicle driving system 100 makes the vehicle travel forward, the driving force of the driving shaft 210 may drive the front wheels and the rear wheels. The driving force of the driving shaft 210 may be obtained at the driving shaft 210 by combining a portion of the driving force that is generated by the engine 200 and the driving force that is generated by the motor generator 131 directed to driving of the vehicle. The portion of the driving force may be obtained as a result of subtracting driving force consumed by the motor generator 121 to generate electric power from driving force generated by the engine 200. In one example, it is possible for the vehicle driving system 100 to switch traveling that uses the driving force of only the motor generator 131 and traveling that uses both the driving force of the engine 200 and the driving force of the motor generator 131, depending on traveling conditions. A portion of the driving force of the engine 200 may be transmitted to the driving shaft 122 of the rotational driving device 120 directed to generating of electric power, thereby making the motor generator 121 generate electric power. In the vehicle driving system 100, when the position of the accelerator pedal exceeds a predetermined position, the motor generator 131 may generate driving force greater than the driving force generated by the engine 200.

[Rearward-Traveling Operation of Vehicle]

When the vehicle driving system 100 makes the vehicle travel rearward, for example, the motor generator 131 directed to driving of the vehicle may be rotated in a direction opposite to the direction at the time when the vehicle travels forward. Thus, the driving shaft 210 may be rotated in the direction opposite to the direction at the time when the vehicle travels forward, thereby causing the vehicle to travel rearward.

[Torque Control Performed by HEV-ECU 50]

When the vehicle mounted with the vehicle driving system 100 travels by both of the driving force of the engine 200 and the driving force of the motor generator 131, a gear rattle may occur at the gear mechanism 10. This phenomenon may occur due to variation in a magnitude relationship between torque of the driving force generated by the engine 200 and torque of the driving force generated by the motor generator 131. The torque of the driving force that is generated by the engine 200 may be referred to as "engine driving torque T1", and the torque of the driving force that is generated by the motor generator 131 may be referred to as "motor driving force T2", hereinafter. In a specific but non-limiting example, a direction of contact between teeth in the gear mechanism 10 in a case where the engine driving torque T1 is greater than the motor driving torque T2, and a direction of contact between the teeth in the gear mechanism 10 in a case where the engine driving torque T1 is smaller than the motor driving torque T2 may be switched. It may be considered that this switching causes a gear rattle. In more detail, it may be considered that the gear rattle occurs at the time when a direction of contact between, for example, meshing parts of the transmission gears 190 and 192 is switched. In addition, it may be considered that there is a possibility that the gear rattle also occurs at meshing parts of the ring gear 146 and the pinion gear 144 and at meshing parts of the sun gear 145 and the pinion gear 144, in the planetary gear mechanism 140. Moreover, it may be considered that there is a possibility that the gear rattle also occurs at meshing parts of the ring gear 156 and the pinion gear 152 and at meshing parts of the sun gear 155 and the pinion gear 152, in the planetary gear mechanism 150.

In an example case where the position of the accelerator pedal is small and the motor driving torque T2 is small, the magnitude of the engine driving torque T1 and the magnitude of the motor driving torque T2 may be close to each other, and therefore, the magnitude relationship the engine driving torque T1 and the magnitude of the motor driving torque T2 may be switched repeatedly, resulting in repeated occurrence of the gear rattle. In contrast, when the position of the accelerator pedal exceeds the predetermined position, the motor driving torque T2 may become greater than the engine driving torque T1 as described above. This makes it more difficult for the repeated gear rattle to occur.

In view of this, the vehicle driving system 100 may make the HEV-ECU 50 adjust each of the engine driving torque T1 and the motor driving torque T2. Controlling the toque enables suppressing of occurrence of the gear rattle between each combination of the above-described components. In one example, continuous occurrence of the gear rattle is suppressed. In a specific but non-limiting example, in a case where the vehicle is accelerated from a state where the position of the accelerator pedal is at the predetermined position or smaller, the motor driving torque T2 may be raised earlier than the engine driving torque T1 to make the motor driving torque T2 swiftly shift to a state of being greater than the engine driving torque T1. This suppresses repeated occurrence of the gear rattle.

Figure 2:
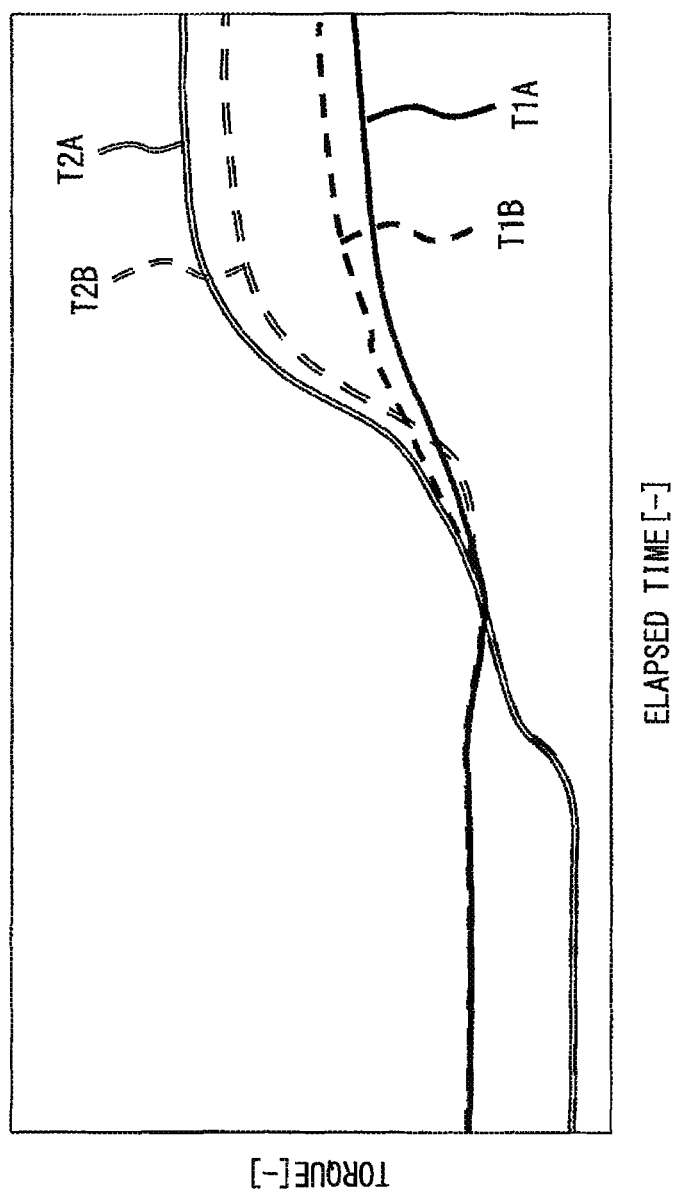
FIG. 2 is a chart for explaining an example of torque control performed in the vehicle driving system illustrated in FIG. 1.

In a specific but non-limiting example, the HEV-ECU 50 may control the torque of the engine 200, as illustrated in FIG. 2. That is, a rate of variation in the engine driving torque T1 at the transmission gear 190 at the time when the following conditional expression (1) is satisfied may be made smaller than a rate of variation in the engine driving torque T1 at a usual time when the following conditional expression (1) is not satisfied. In other words, in the case where the conditional expression (1) is satisfied, the engine driving torque T1 may be varied more moderately than usual.

$$|T2-T1|<Th1 \qquad (1)$$

In the conditional expression (1), T1 is the engine driving torque, T2 is the motor driving torque, and Th1 is a first threshold that may be set in advance. In FIG. 2, T1A describes variation in the engine driving torque in the case where the conditional expression (1) is satisfied and T1B describes variation in the engine driving torque at the usual time when the conditional expression (1) is not satisfied. The first threshold Th1 may represent a torque difference and may be, for example, approximately 30 N·m.

In the case where the difference between the engine driving torque T1 and the motor driving torque T2 is small, as represented by the conditional expression (1), it may be easier for the magnitude relationship between the engine driving torque T1 and the motor driving torque T2 to be switched, making it easier for the direction of contact between the teeth in the gear mechanism 10 to be switched. As a result, the gear rattle may occur more easily. In consideration of this, when the difference between the engine driving torque T1 and the motor driving torque T2 is less than the first threshold Th1, the rise of the engine driving torque T1 may be moderated, that is, so-called "torque smoothing" may be performed. Thereby, the motor driving torque T2 may rise relatively earlier than the engine driving torque T1, whereby a relationship "T2>T1" may be maintained at any time. This suppresses switching of the direction of contact between the teeth in the gear mechanism 10, thereby suppressing occurrence of the gear rattle.

The gear rattle may tend to occur at the time when the vehicle is accelerated. Therefore, in one example implementation, the torque control described above may be performed by the HEV-ECU 50 at least at the time when the engine driving torque T1 rises.

In one example implementation, the HEV-ECU 50 may control the torque as illustrated in FIG. 2. That is, a rate of variation in the motor driving torque T2 at the transmission gear 192 at the time when the conditional expression (1) is satisfied may be made greater than a rate of variation in the motor driving torque T2 at the transmission gear 192 at the usual time when the conditional expression (1) is not satisfied. In other words, in the case where the conditional expression (1) is satisfied, the motor driving torque T2 may be varied more steeply than usual. This enables compensating, with the motor driving torque T2, a decrement of the engine driving torque T1, which occurs due to the decreased rate of variation in the engine driving torque T1, that is, an amount of torque insufficient for requested torque. In FIG. 2, T2A describes variation in the motor driving torque in the case where the conditional expression (1) is satisfied and T2B describes variation in the motor driving torque at the usual time when the conditional expression (1) is not satisfied.

In one example implementation, the HEV-ECU 50 may perform the above-described torque control in a case where the engine driving torque T1 is equal to or smaller than a second threshold Th2. The second threshold Th2 may be torque at a time when the engine 200 generates a predetermined output and may be set on the basis of the number of rotation of the engine 200. In a specific but non-limiting example, the torque control may be performed in a case where the engine driving torque T1 satisfies the following conditional expression (2) that relates to an output request P of the engine 200.

$$P > T1 \times N \times 2\pi/60 \qquad (2)$$

In the conditional expression (2), N is the number of rotation of the engine 200. One reason for setting such a condition for executing the torque control is as follows. That is, if the torque smoothing described above is performed when the output request of the engine 200 is great, an accelerating performance of the vehicle may be limited, thereby making it more difficult to sufficiently respond to the request of a driver. The output request P or the predetermined output of the engine 200 may be, for example, approximately 15 kW.

In one example implementation, the HEV-ECU 50 may perform the above-described torque control in a case where a temperature T of the oil is equal to or higher than a reference temperature Th3. The oil may be directed to, for example, cooling and lubricating of the gear mechanism 10. The oil may be, for example, an ATF. One reason for the above is that a gear rattle may be reduced to a degree at which a driver is not disturbed, in the case where the temperature T of the oil is lower than the reference temperature Th3. When the temperature T of the oil is a relatively-low temperature of lower than the reference temperature Th3, viscosity of the oil may be higher compared with that in a case where the temperature T of the oil is equal to or higher than the reference temperature Th3. Therefore, friction between the meshing parts of the gears is relatively greater, resulting in relieving impact of the contact between the teeth and in reducing the gear rattle. The reference temperature Th3 may be, for example, approximately 10° C. As described above, in the case where the torque smoothing is performed on the engine driving torque T1, the decrement of the engine driving torque T1 may be compensated with the motor driving torque T2. However, in one example implementation, the above-described torque control may not be performed in a case where the oil has a low temperature because an amount of electric power consumption of the battery 70 is desired to be reduced as much as possible.

[Workings and Effects of Vehicle Driving System 100]

As described above, in the vehicle driving system 100 of one example implementation of the technology, the HEV-ECU 50 performs the torque control. In a specific but non-limiting example, the HEV-ECU 50 controls the torque of the engine 200, as illustrated in FIG. 2. That is, the rate of variation in the engine driving torque T1 at the time when the conditional expression (1) is satisfied is made smaller than the rate of variation in the engine driving torque T1 at the usual time when the conditional expression (1) is not satisfied. This stabilizes the direction of contact between the teeth of the gears inside the gear mechanism 10, thereby effectively suppressing occurrence of the gear rattle. In one example, repeated occurrence of the gear rattle is effectively suppressed.

The vehicle driving system 100 of one example implementation of the technology may perform the torque control to make the rate of variation in the motor driving torque T2 at the time when the conditional expression (1) is satisfied greater than the rate of variation in the motor driving torque T2 at the time when the conditional expression (1) is not satisfied. This enables compensating a decrement of the engine driving torque T1 with the motor driving torque T2. Accordingly, a superior traveling performance is secured.

The vehicle driving system 100 of one example implementation of the technology may make the HEV-ECU 50 perform the torque control at the time when the engine driving torque T1 rises. This effectively suppresses occurrence of the gear rattle that tends to occur at the time when the vehicle accelerates.

The vehicle driving system 100 of one example implementation of the technology may make the HEV-ECU 50 perform the torque control in a case where the engine driving torque T1 that is required with respect to the engine 200 is equal to or less than the second threshold Th2. This allows exhibition of a traveling performance of the vehicle to have priority over suppression of a gear rattle.

The vehicle driving system 100 of one example implementation of the technology may make the HEV-ECU 50 perform the torque control in the case where the temperature T of the oil is equal to or higher than the reference temperature Th3. This suppresses amount of electric power consumption of the battery 70.

2. Modification Examples

Although an example implementation of the technology has been described in the foregoing, the technology is by no means limited to the example implementation described above and is variously modifiable.

For example, the forgoing example implementation is illustrated as an example where the vehicle driving system is mounted on a hybrid electric vehicle. The technology is, however, not limited thereto. The driving system of one example implementation of the technology may also be mounted on a movable body other than an automobile, such as a ship or an aircraft, and drive the movable body. The driving system of one example implementation may also be mounted on an apparatus that does not travel, such as construction machinery or a working robot, and drive the apparatus.

The effects described herein are mere examples. The effects are not limited thereto and any other effect may be provided.

Each of the HEV-ECU 50 and the ECU 80 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the HEV-ECU 50 and the ECU 80 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the HEV-ECU 50 and the ECU 80 illustrated in FIG. 1.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A driving system comprising:
an engine;
a motor generator;
a gear mechanism that couples the engine and the motor generator to each other; and
a controller,
wherein the gear mechanism includes a first gear and a second gear,
wherein the first gear is configured to be supplied with a first driving torque from the engine, the first driving torque being a torque of a driving force generated by the engine,
wherein the second gear is configured to be supplied with a second driving torque from the motor generator, the second driving torque being a torque of a driving force generated by the motor generator,
wherein the second gear is configured to mesh with the first gear, and
wherein the controller is configured to perform torque control of the engine to make a rate of variation in the first driving torque at the first gear at a time when the following conditional expression (1) is satisfied smaller than a rate of variation in the first driving torque at the first gear at a time when the following conditional expression (1) is not satisfied, $$|T2-T1|<Th1 \quad (1)$$

where T1 is the first driving torque, T2 is the second driving torque, and Th1 is a first threshold.

2. The driving system according to claim 1, wherein the controller is configured to perform the torque control to make a rate of variation in the second driving torque at the second gear at the time when the conditional expression (1) is satisfied greater than a rate of variation in the second driving torque at the second gear at the time when the conditional expression (1) is not satisfied.

3. The driving system according to claim 2, wherein the controller is configured to perform the torque control when the first driving torque rises.

4. The driving system according to claim 3, wherein the controller is configured to perform the torque control in a case where output requested torque for the engine is equal to or smaller than a second threshold.

5. The driving system according to claim 4, further comprising a fluid configured to lubricate the gear mechanism, wherein
the controller is configured to perform the torque control in a case where a temperature of the fluid is equal to or higher than a reference temperature.

6. The driving system according to claim 2, further comprising a fluid configured to lubricate the gear mechanism, wherein
the controller is configured to perform the torque control in a case where a temperature of the fluid is equal to or higher than a reference temperature.

7. The driving system according to claim 3, further comprising a fluid configured to lubricate the gear mechanism, wherein
the controller is configured to perform the torque control in a case where a temperature of the fluid is equal to or higher than a reference temperature.

8. The driving system according to claim 1, wherein the controller is configured to perform the torque control when the first driving torque rises.

9. The driving system according to claim 8, wherein the controller is configured to perform the torque control in a case where output requested torque for the engine is equal to or smaller than a second threshold.

10. The driving system according to claim 9, further comprising a fluid configured to lubricate the gear mechanism, wherein
the controller is configured to perform the torque control in a case where a temperature of the fluid is equal to or higher than a reference temperature.

11. The driving system according to claim 8, further comprising a fluid configured to lubricate the gear mechanism, wherein
the controller is configured to perform the torque control in a case where a temperature of the fluid is equal to or higher than a reference temperature.

12. The driving system according to claim 1, further comprising a fluid configured to lubricate the gear mechanism, wherein
the controller is configured to perform the torque control in a case where a temperature of the fluid is equal to or higher than a reference temperature.

* * * * *